(12) United States Patent
Taylor

(10) Patent No.: US 7,702,592 B2
(45) Date of Patent: Apr. 20, 2010

(54) SECURE TRANSFER OF CONTENT TO WRITABLE MEDIA

(75) Inventor: James H. Taylor, Fox Island, WA (US)

(73) Assignee: Sonic Solutions, Novato, CA (US)

( * ) Notice: Subject to any disclaimer, the term of this patent is extended or adjusted under 35 U.S.C. 154(b) by 0 days.

(21) Appl. No.: 10/987,446

(22) Filed: Nov. 12, 2004

(65) Prior Publication Data

US 2005/0154682 A1    Jul. 14, 2005

Related U.S. Application Data

(60) Provisional application No. 60/520,537, filed on Nov. 14, 2003.

(51) Int. Cl.
*G06F 17/60* (2006.01)
(52) U.S. Cl. .............................. 705/71; 705/50; 705/51; 705/57
(58) Field of Classification Search .................. 705/50, 705/51, 57, 71
See application file for complete search history.

(56) References Cited

U.S. PATENT DOCUMENTS

| | | | |
|---|---|---|---|
| 6,496,807 B1 | 12/2002 | Inokuchi et al. | |
| 6,532,201 B1 | 3/2003 | Hogan | |
| 6,671,376 B1 | 12/2003 | Koto et al. | |
| 6,741,795 B1 | 5/2004 | Takehiko et al. | |
| 6,812,864 B2 | 11/2004 | Koto et al. | |
| 6,903,666 B2 | 6/2005 | Koto et al. | |
| 6,952,697 B1 | 10/2005 | Rothschild | |
| 6,957,343 B2 | 10/2005 | Ripley et al. | |
| 7,017,100 B2 | 3/2006 | Kojima et al. | |
| 7,162,646 B2 * | 1/2007 | Wu et al. ..................... 713/193 | |
| 2001/0036268 A1 | 11/2001 | Kuroda et al. | |
| 2001/0052078 A1 | 12/2001 | Kuroda et al. | |

(Continued)

FOREIGN PATENT DOCUMENTS

EP    1 185 022 A1    3/2002

(Continued)

OTHER PUBLICATIONS

Written Opinion by The International Bureau of WIPO, May 26 2006, PCT/US2004/037787, 8 pages.

(Continued)

*Primary Examiner*—Pierre E Elisca
(74) *Attorney, Agent, or Firm*—Fitch, Even, Tabin & Flannery

(57) ABSTRACT

The present embodiments provide methods for writing content to a media that comprise retrieving a first portion of a key structure from the media or a remote server, generating or receiving a second portion of the key structure based on the first portion of the key structure, encrypting content based at least on the second portion of the key structure, producing encrypted content, and writing the encrypted content onto the media. The present embodiments further provide recording media that include a digitally writable surface that is optically readable, a control area optionally comprising a pre-recorded set of keys defining a first portion of a key structure, and a data portion that records non-pre-recorded content protected according to a second portion of the key structure generated according to at least a portion of the first portion of the key structure.

28 Claims, 7 Drawing Sheets

U.S. PATENT DOCUMENTS

| | | | |
|---|---|---|---|
| 2002/0001385 | A1 | 1/2002 | Kawada et al. |
| 2003/0004888 | A1* | 1/2003 | Kambayashi et al. ......... 705/59 |
| 2003/0081777 | A1 | 5/2003 | Brondijk et al. |
| 2003/0081778 | A1 | 5/2003 | Tsumagari et al. |
| 2003/0090830 | A1 | 5/2003 | Kitagawa |
| 2003/0091186 | A1 | 5/2003 | Fontijn et al. |
| 2003/0115146 | A1* | 6/2003 | Lee et al. ...................... 705/57 |
| 2003/0161615 | A1 | 8/2003 | Tsumagari et al. |
| 2003/0181198 | A1 | 9/2003 | Sato et al. |
| 2004/0030902 | A1* | 2/2004 | Asano et al. ................ 713/176 |
| 2004/0034787 | A1 | 2/2004 | Kitani |
| 2004/0052369 | A1 | 3/2004 | Stebbings |
| 2004/0100888 | A1 | 5/2004 | Kanda et al. |
| 2004/0136698 | A1 | 7/2004 | Mock |
| 2005/0015616 | A1 | 1/2005 | Hogan |
| 2005/0021961 | A1* | 1/2005 | Hanks et al. ................ 713/171 |
| 2005/0038997 | A1 | 2/2005 | Kojima et al. |
| 2005/0246745 | A1 | 11/2005 | Hirsch |
| 2006/0023598 | A1 | 2/2006 | Babinski et al. |

FOREIGN PATENT DOCUMENTS

| | | |
|---|---|---|
| EP | 1291867 A2 | 3/2003 |
| EP | 1 291 867 A2 | 12/2003 |
| EP | 1 297 867 A2 | 12/2003 |
| JP | 2003/157202 A * | 5/2003 |

OTHER PUBLICATIONS

European Patent Office, European Search Report for Application 04801022.7 1525 PCT US 2004/037787, Date mailed Dec. 20, 2006.

First Office Action of The Patent Office of The State Intellectual Property Office of The People's Republic of China for Chinese Patent Application No. 2004800335870 dispatched Jul. 24, 2009 (81349CN).

* cited by examiner

SECURE TRANSFER OF CONTENT TO WRITABLE MEDIA

PRIORITY CLAIM

This application claims the benefit of U.S. Provisional Application No. 60/520,537, entitled SECURE TRANSFER OF CONTENT TO WRITABLE MEDIA, filed Nov. 14, 2003, which is incorporated herein by reference in its entirety.

FIELD OF THE INVENTION

The present embodiments relates generally to writable media, such as a digital video disc (DVD), and, more specifically, to allowing the writing of protected content onto such media.

BACKGROUND

Movie and music industries generate billions of dollars in revenue. A significant percentage of this revenue is through sales and rentals of movie titles and/or albums directly to consumers. Individual consumers can go to retail outlet stores and purchase movie titles, for example, on digital video discs (DVD) which can then be played at the users' home on DVD players.

By allowing users to purchase titles for at-home use, the movie industry has substantially increased its revenues. Other systems deliver movie titles directly to a user's home, for example through the Internet, cable television and/or satellite communication. Video-on-demand allows a user to select a desired title from a list of available titles, and the title is delivered to the user. Typically, the user must view the content at a predefined time. In some instances, a user is required to view the title within a predefined time period (e.g., within 24 hours).

Titles made available to the public, either through purchases of DVDs or through on-demand service, are protected in attempts to prevent users from duplicating the content. As such, users are generally unable to copy the content.

SUMMARY OF THE EMBODIMENT

The present embodiments advantageously addresses the needs above as well as other needs through the provision of the method, apparatus, and system for use in securely writing content to a media. Some embodiments provide methods for writing content to a media that comprises retrieving a first portion of a key structure from a media; generating a second portion of the key structure based on the first portion of the key structure; encrypting content based at least on the second portion of the key structure, producing encrypted content; and writing the encrypted content onto the media.

Other embodiments provide methods for use in recording content to a media, that comprises accessing a media; determining whether the media includes at least a first portion of a key structure; accessing a remote device; retrieving at least the first portion of the key structure from the remote device when the first portion of the key structure is not included on the media; accessing content; protecting the content with at least the first portion of the key structure; and writing the protected content onto the media.

In some embodiments a recording media is provided. The recording media of these embodiments comprise a digitally writable surface that is optically readable; a control area comprising a pre-recorded disk key and device key set defining a first portion of a key structure; and a data portion that records non-pre-recorded content protected according to a second portion of the key structure generated according to at least a portion of the first portion of the key structure.

Some embodiments additionally provide methods of use in recording content on a media. There methods comprise recording content onto a digitally writable disc that is further optically readable; and altering physical characteristics of the disc such that the disc no longer appears as a writable disc.

A better understanding of the features and advantages of the present invention will be obtained by reference to the following detailed description of the invention and accompanying drawings which set forth an illustrative embodiment in which the principles of the invention are utilized.

BRIEF DESCRIPTION OF THE DRAWINGS

The above needs are at least partially met through provisions of methods, apparatuses, and/or systems for use in securely recording content as described in the following detailed description, particularly when studied in conjunction with the drawings, wherein.

Figure 1:
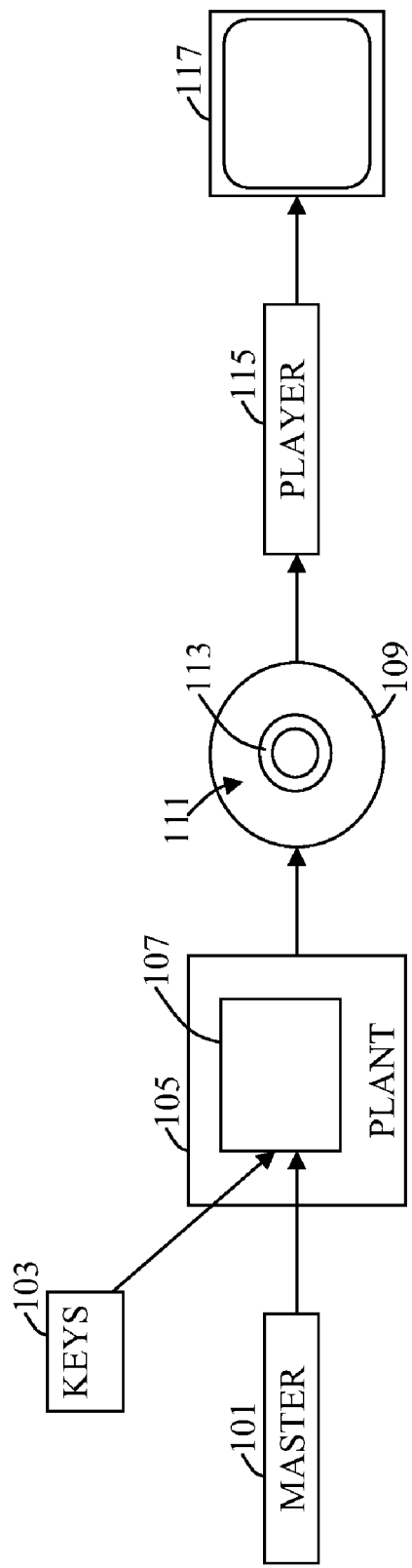
FIG. 1 depicts a simplified schematic diagram of a standard manufacturing process for replicating DVDs.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

The present embodiments provide methods and systems for use in securely transferring and/or recording content to a writable media. Further, the present embodiments enable the secure transfer of content, such as video, audio, television programming, data, information, software, executables, music, and substantially any other content from networked, local and/or portable storage systems and media to recordable media, such as a digital video disc (DVD), compact disc (CD), and other relevant media. By combining specialized authoring and data writing techniques, which in some implementations includes corresponding software, the content can securely be stored on the media. In some embodiments, specialized recordable media is employed that supplements the advantages and enhancements provided through the present embodiments. Although the various aspects of the present embodiments are primarily described below in terms of DVD embodiments, these embodiments may also be applied to content on other writable media.

Typically, DVDs distributed to the public incorporate protections that attempt to prevent unauthorized copying and/or other unauthorized use of the content. There are many different types of protection. Some present embodiments, allow content to be recorded to writable media incorporating the protections that commonly distributed content often employ. For example, the content of a DVD, such as a movie title, is often recorded in an encrypted form along with a key structure by which it may be played using an authorized player.

A particular content protection scheme compliant with the DVD Forum's DVD-Video specification is Content Scramble System (CSS), where the content is encrypted through a combination of a disc key and a title key, the title key being specific to a particular content title with which it is stored and the disc key corresponding to disc as a whole. The disc key and one or more device key sets are hidden in the control area of the disc, where they are not directly accessible. When the disc is played, the device key set is used to authenticate the play, after which the disc key is used in conjunction with the title key to unscramble and present the title and/or allow access to the content. Content protection and other aspects of the DVD media are described more fully in DVD Demystified, Second Edition, by Jim Taylor, McGraw-Hill, 2001, which is hereby incorporated by reference.

The standard manufacturing process of a replicated DVD is shown schematically in FIG. 1. A master of the content 101 is provided in an unprotected form from a source (e.g., a movie studio). At a duplication plant or factory 105, the master content 101 is combined with protection key structures 103 to form a media image. The media image typically includes any processing or authoring applied to the content, including encryption based on the key structures, in order to form the media image. The media is stamped at 107, producing the media 109 itself, for example, a DVD containing the content in the media image. The resulting DVD 109 typically has a control zone 113, shown here schematically as occupying an inner portion of the disc, and a data zone 111. In a CSS or otherwise protected DVD, the data portion 111 typically contains the scrambled data content (e.g., encrypted content) and title keys arranged according to the DVD specification. The control zone 113 typically includes one or more disc keys and device key sets, and generally is not directly accessible to a user. The content is then accessible through a player device, such as a computer, player or other such device. For example, a DVD 109 can be played on an authorized player 115, an image being displayed on a TV or monitor 117.

To produce the image, the player typically uses internal keys for successful decryption applied to the device key set in the control zone 113, which can be accessed via a special authentication protocol with the drive of the player. The player is then allowed to access the disc key, which it then uses in conjunction with the title keys to reassemble the content and/or title in a form that can be played, e.g., played on the TV or monitor 117.

The process described with respect to FIG. 1 is typical for the mass replication of DVDs. More recently, there have arisen recordable and/or writable DVDs, which have a number of formats such as DVD-R (recordable), DVD-RW (re-writable), DVD+R (recordable), DVD+RW (re-recordable), DVD-RAM (re-recordable), and other formats.

Some present embodiments, at least in part allow content to be recorded onto writable media (e.g., writable DVDs, compact discs (CD), and other media) while extending encryption systems and/or schemes intended for replicated DVDs onto recordable DVDs. As such, the present embodiments extend the copy protection typically found with replicated DVDs to content recorded on recordable and/or writable media.

As introduced above, the present embodiments provide systems and methods for enabling the secure transfer of content to recordable media. In some embodiments, one or more specialized authoring techniques are combined with specialized recordable media to securely store content on the media. In some implementations the content is stored in a secure and/or encrypted form. For example, some embodiments record CSS-encrypted content on recordable discs, which allows compatibility with existing player back devices. Other content protection schemes can similarly be employed, such as CSS+, Advanced Access Content System (AACS) and other such schemes.

In some embodiment, for example, the methods and/or systems makes it possible to download copyrighted video content and securely transfer that content to recordable DVD media, with the resulting DVD-Video disc being both CSS encrypted and maintaining full compliance with the DVD Forum's DVD-Video specification (DVD Specifications for Read-Only Disc Part 3), which is hereby incorporated by reference. Similarly, the content downloaded can already be encrypted through an alternate, external encryption scheme and then converted to the desired encryption scheme prior to recording on the DVD. Additionally, multiple content streams can be received and combined onto a single media (e.g., DVD). For example, a first stream of content can comprise a feature movie and a second stream can include navigational structure (e.g., menus, chapter stops, and the like). These two streams can be combined locally and authored and protected, for example, with CSS and then recorded onto the media (e.g., burned to a disc in DVD format).

Aspects of the embodiments include specialized methods, implemented through software and/or hardware components, and utilize, in some implementations, specialized recordable media. The software/hardware components are designed to provide a secure path for video and audio data from local or networked storage, through an authoring process or system and an encryption process (e.g., CSS encryption), and onto specialized recordable DVD media. In the authoring process, the content may be augmented with additional audio and video information and multiplexed into DVD-Video compliant files.

In some embodiments, the recordable media component consists of specially manufactured recordable media. For example, in some media a non-writeable lead-in area is provided that includes a set of encrypted device keys and disc key, such as a CSS device keys, that are pre-recorded onto the media. The pre-recording includes substantially any writing, recording, laser recording, pre-stamping, and other such placement on the media. In some implementations, the device keys are pre-recorded in a form consistent with standard manufactured CSS-encrypted DVD-Video discs. Some embodiments further include a set of device keys that are used by devices authorized to playback the content on the media, as well as a set of device keys utilized by devices authorized to write content to the recordable media. The methods and systems can be used in the DVD+R, DVD+RW, DVD-R, DVD-RW, or other DVD formats, or other media formats. The key structure(s) can be pre-recorded onto the media at a pre-defined location, or alternatively, can be distributed onto the media in a plurality of locations. In some embodiments, the key structure is positioned in an area that is normally not accessible to recording and/or player devices, which is compatible with some existing technologies.

It is well known in the art that logic or digital systems and/or methods can include a wide variety of different components and different functions in a modular fashion. The following will be apparent to those of skill in the art from the teachings provided herein. Different embodiments can include different combinations of elements and/or functions. Further, different embodiments can include actions or steps performed in a different order than described in any specific example herein. Still further, different embodiments can include groupings of parts or components into larger parts or components different than described in any specific example herein. For purposes of clarity, the embodiments are described in terms of systems that include many different innovative components and innovative combinations of innovative components and known components. No inference should be taken to limit the embodiments to combinations containing all of the innovative components listed in any illustrative embodiment in this specification. The functional aspects of the embodiments, as will be understood from the teachings herein, may be implemented or accomplished using any appropriate implementation environment, programming language, such as C++, Java, JavaScript, Linux, etc, hardware and/or combinations of software and hardware.

Figure 2:
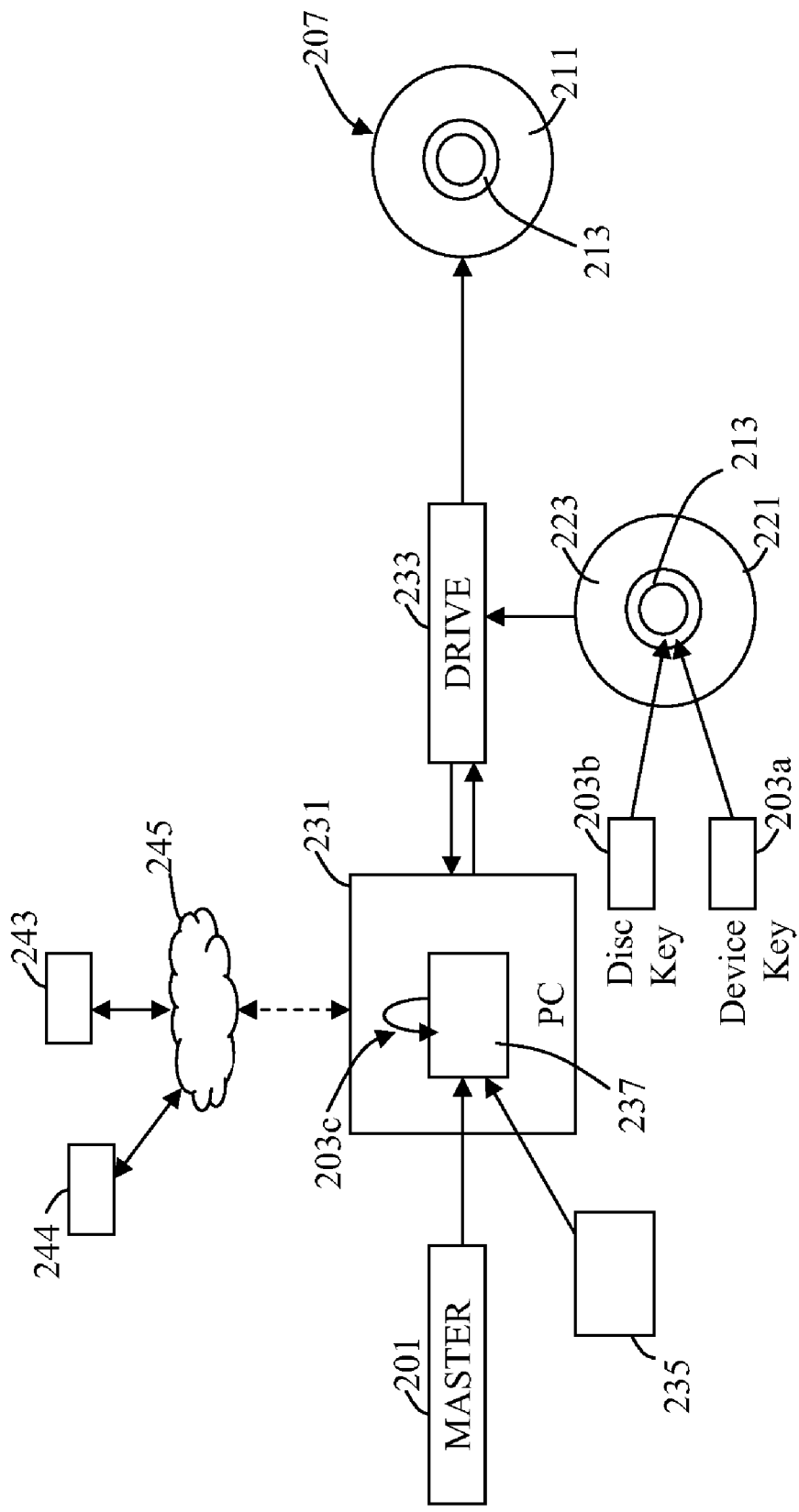
FIG. 2 depicts a simplified schematic representation of various aspects of some embodiments for use in the secure transfer of content to a writable media.

FIG. 2 depicts a simplified schematic representation of various aspects of some embodiments for use in the secure transfer of content to a writable media 221. As indicated above, some embodiments employ a specialized recording media 221 that has been pre-recorded with disc key and at least some of the device keys. The pre-recording includes substantially any burning, stamp recording, writing, laser recording, and other such placement on the media. In some embodiments, however, the key structure or portions of the key structure is recorded onto the media prior to and/or along with recording of the content.

The media shown in FIG. 2 is shown as a DVD 221, however, other media can be utilized. In some embodiments, the DVD 221 is a custom or special DVD that includes a data portion 223, which is blank and into which the content is to be written, and a control area 213. The DVD is shown with the control area 213 positioned at an inner radius of the DVD. The control area, however, can be positioned at substantially any area, distributed and/or divided up over the DVD. In some embodiments, the control area is an area that is not normally accessible by recording and/or playing devices. Existing DVDs have similar control areas that are typically not accessible to recording devices.

When the DVD 221 is received by a user for recording, the control area 213, in some embodiments, already contains at least a portion of one or more key structures. For example, in some implementations, the DVD is a custom DVD with a portion of the key structure pre-recorded in the control area 213, where the portion of the key structure includes one or more disc keys 203b and device key sets 203a, and further includes one or more writable/recordable sections allowing content to be written to the DVD. The writable media 221 is pre-recorded according to known methods for a blank disc to already have a basic structure of writable DVD formats. The key structures can either be pre-recorded as part of the manufacturing process, subsequently written, or some combination thereof, prior to the user receiving the media. For example, the disc key could be pre-recorded, with the set (or a partial set) of the device keys written at a later time.

As the key structures are written in a predefined area or areas of the media, for example in one or more areas that typically are not directly accessible by authoring devices and/or workstations 231, the media 221 is marked, in some implementations, in a way that allows it to be identified as special or custom media. For example, several bits in the control area or zone 213 may be used as a flag to identify the media as custom media already containing keys. A set of write device keys, analogous to the (player) device keys already in the device key set 203a can be used for verification that a device is authorized for writing to the special media. The write device keys can be a part of the player device key set, a separate key set, or partially overlapped.

In some embodiments, the key structure or a portion of the key structure is generated and/or recorded through the recording and/or authoring system 231. The generation of part or all of the key structure can be based on a portion of the key structure pre-recorded on the media 221, the content to be written, a serial number or other media identification, and other parameters. In some embodiments, the authoring device 231 optionally accesses one or more remote authentication and/or authority devices 243 to receive a portion of the key structure to be written onto the media. For example, the authoring device 231 can communicate with an authentication device 243 through a direct connection, a network, a distributed network 245 such as the Internet, or other coupling to receive some or all of the key structure and/or other authentication parameters. The remote authority device, in some implementations, is supplied with information identifying the authoring device (e.g., client ID, user ID, Player ID, Drive ID, Media ID, Disc ID, burst cutting area (BCA), and/or other such identification). In some embodiments, the portion of the key structure received from the authentication device 243 is received only after a verification from the authoring device, and in some instances, after a user pays for authorization to write the content. The key structure or portion of key structure received from the authentication device 243 is, in some embodiments, written to the media 221 or additional keys are generated based on the received authorization that are written to the media. For example, the authoring device can be configured to write the key structure or portions of the key structure to the control area 213 that is normally not accessible to authoring devices once the media is identified as the custom media.

The content 201 to be securely written onto the media is not restricted as to its origin and could be downloaded from the Internet (e.g., from the authentication device 243 or one or more separate remote devices 244), retrieved from a remote or local memory such as from other media, RAM, and substantially any other relevant source. If the data is encrypted, the information to decrypt is also retrieved, which can include accessing other media and/or internet sites. The content may also be subject to limited protection in some manner. For example, the content could be already stored in a secure digital rights management system (DRM) that allows for a limited copying, in terms of time or number, or is otherwise restricted and protected (typically a DRM system has usage rules in a content license that control its use). Similarly, the content may be received from a remote location (e.g., accessed over the internet, or delivered through a communication channel such as cable television and/or satellite television), that allows for limited copying.

Content can be received and also be identified as content to be provided certain levels of protection, for example the content can be received and identified through broadcast flag bits, copy generation management system (CGMS), digital transmission content protection (DTCP), video content protection system (VCPS), content protection for removable media (CPRM), high-bandwidth digital content protection (HDCP), advanced access content system (AACS), and other protected content. (Further discussion of broadcast flags and CGMS is provided in Appendix A). Additionally, and/or alternatively, the access to protected content can be controlled through a DRM (e.g., as typically utilized with personal computers), conditional access (e.g., as utilized with set-top-boxes and/or satellite receivers), and/or other such controls (further details relating to DRM and conditional access is provided in Appendix A). The U.S. Federal Communication Commission has also issued guidelines for the protections of some content (e.g., see "Digital Broadcast Content Protection", Report and Order and Further Notice of Proposed Rulemaking; Federal Communication Commission; FCC 03-273; MB Docket 02-230; Nov. 4, 2003, incorporated herein by reference in its entirety). Additionally and/or alternatively, a remote server supplying content can be supplied with a key, such as a disc key from the authoring device, allowing the remote server to encrypt the content using the disc key. The encrypted content is then forwarded to the authorizing device that records the encrypted content along with title keys, other content, other parameters and/or other data. Some content may have already been encrypted before it is accessed by an authoring device (such as a computer). For example, video and audio data, such as movies, can be received on demand (video-on-demand). In some implementations, and with the authorization of the content owner (movie studio), the present embodiments allow for the recording of video-on-demand content.

Still referring to FIG. 2, to perform the write process, the content 201 is provided to the authoring device 231, such as a computer or authoring workstation 231, and the media 221 is put into the connected to read/write drive 233. By checking the DVD for the special media indication, the authoring device recognizes whether the media is in fact specialized media on which content can be written. In some implementations, the media contains an identifier, such as series of bits and/or a burst cut area (BCA) that identify the type of media, identify pre-recorded keys, and/or authenticate content. For example, the BCA could include one or more keys used to authenticate the media as protected media. This BCA information provides, in some implementations, the ability to uniquely identify each disk by serial number, for example by including a unique serial number within the BCA. The software 237, in some embodiments, accesses the disc key 203b, from the control area 213 and/or remotely retrieves the disc key. The authoring device further obtains and/or generates one or more title keys 203c for use when the content is encrypted prior to writing the disc image of the content. Some embodiments utilize pre-recorded media that has been recorded with a least part of one or more key structures, unlike the media of FIG. 1 where the disc key and title keys are from a licensing agency, such that the disc key is obtained from the pre-recorded media and the title keys 203c can be generated on the fly using this disc key or other parameters or keys. In some embodiments, the one or more title keys are remotely retrieved, for example over the internet from a licensing authority selected from a collection stored on a server, and utilized in encrypting the content. Further, some embodiments generate one or more of the title keys according to an algorithm using pre-recorded keys, remotely received keys and/or other parameters (e.g., disc serial number, the content to be written, and other relevant parameters). The algorithm can be substantially any relevant algorithm, such as algorithms defined according to CSS technical specifications. As indicated above, multiple titles can be included on a single media. One or more title keys can be utilized for each title recorded on media, where the instance keys are retrieved from a remote device, and/or generated locally and/or remotely.

In embodiments where the disc key (or more generally the media key) is already recorded on the media when it is received by the user, the disc key is picked based on the particular media and without reference to the content. The disc key can be the same for all copies of the medium or, to increase security, changed regularly as the medium is produced or even be specific to a given copy (e.g., based on a serial number or some other unique identifier of a media).

In the authoring process, the content 201 may be augmented with additional audio, video and/or other information 235 from outside the authoring device 231, or content already locally stored in memory of the authoring device, and multiplexed into the content of DVD-Video compliant files. Various aspects of authoring are described further in U.S. patent applications, which are all hereby incorporated by reference: Ser. No. 10/123,816, filed Apr. 15, 2002; Ser. No. 10/119,993 filed Apr. 9, 2002; Ser. No. 10/408,027 filed Apr. 3, 2003; and Ser. No. 60/439,055 filed Jan. 8, 2003. The augmented content can be substantially any content, such as director commentary for a movie, additional features and/or functions, content navigational parameters, and substantially any other relevant additional content. For example, in some implementations, the embodiments are capable of receiving content (e.g., audio and video content) from a remote location (e.g., through cable and/or satellite television) and augmenting the content with additional content (e.g., director commentary, additional scenes, out-takes, and other such content), and/or with navigational parameters and/or control (e.g., menus, chapter stops, graphics and other parameters and functions) that format the content and/or allow a user to later control the access to desired content upon later playback of the recorded content. The augmented content can be multiplexed with the initial content and/or stored on the media distinct from the initial content.

Once the DVD-Video compliant, or other appropriate media compliant, files are produced at the end of the authoring process, the files can then be protected based on the key structures to form the media image, in some embodiments containing the content and the title keys, that is then written onto the data portion 223 of the media 221 by the drive 233. Unlike the previous DVDs, where the entire key structure (disc key and title keys as well as the device key set) is placed onto blank media at the same time as the content during the pre-recording process, the present embodiments begin with a media that typically already contains part of the key structure and then places another part of the key structure on the disc as part of the writing process during recording. In some implementations of the present embodiments, the title keys are written into sector headers, which are typically not accessible for writing.

The resultant disc 207 can then be played on a player similar to other replicated DVDs (e.g., similar to disc 107 of FIG. 1). The device keys 203a, used at least in part for player authentication, and the disc key 203b are still in the control area as in the blank (as far as data) media 221. The data portion 211 now contains the content and title keys. As with a standard disc, when the disc 207 is played in a standard player, the device key is used to authenticate, allowing access to the disc key that is then used in conjunction with the title key to extract and decrypt the content from the disc.

Consequently, the present embodiments allow a protection and/or encryption system intended for replicated DVDs to be extended to recordable DVDs. In some embodiments the protection system includes Content Scramble System (CSS). The use of special recording media with pre-recorded device keys or encryption keys in a reserved area allows the present embodiments to utilize these keys at least in part to encrypt content recorded on the disc in such a way as to be playable on standard DVD-Video players. These techniques apply to substantially any relevant writable media and/or format, such as but not limited to recordable DVD and CD formats (DVD-R, DVD-RW, DVD+R, DVD+RW, DVD-RAM, CD-R, CD-RW, HD-DVD), Blu-ray Disc (e.g., BD-R (Blu-ray recordable), BD-RE (re-rewritable), BD-ROM, and other various forms), and other such relevant media.

As indicated above, some embodiments record content to the media that is CSS encrypted and/or compatible with systems that decode CSS. By putting the written content into CSS form, the media provides additional security that is achieved by CSS. For example, some embodiments employ CSS to include anti-taping parameters (e.g., setting trigger bits that activate Macrovision®), and/or region codes. In the absence of CSS, playback devices typically do not have to respect these additional security codes or flags. Therefore, by applying CSS the present embodiments are capable of employing the additional benefits and securities provide by CSS.

In some embodiments, however, the media is altered from a standard CSS disc so that a playback device will play or allow access to the content. In some instances with other media configurations, licenses associated with CSS prevent players from playing content when it is content on a recordable media. For example, with DVDs, the types of DVD (e.g., DVD ROM, DVD-R, DVD-RW, and the like) are often identified by a set of bits. Some player devices access these bits to determine whether the player can playback the content. For example, some players do not playback content on writable discs. As such, some present embodiments alter and/or manufacture the special media so that an identifying bit set identifies the media as a DVD ROM or other format that a player accepts and thus plays the content. In some implementations the special media is pre-recorded with the appropriate bit set. In other embodiments, the authoring device writes the appropriate bit set and/or overwrites the bit set so that standard players play the recorded content.

Some embodiments further employ and/or alter the media to overcome additional parameters and/or characteristics that may prevent players from rendering or providing access to the content. The authoring device, in some embodiments, implements physical changes to the media (e.g., disc). For example, the authoring device alters a reflectivity of the disc, alters the pre-recorded data on the disc, and/or other parameters and/or characteristics of the media. In some embodiments, section headers which can include address information and/or other data used by recorders or players in identifying where they are on the media. Lead-in information can also be altered, which can include media identification information (that may identify a disc as a recordable disc), and other data that can be altered. Some embodiments further alter the wobble groove of a disc, by altering modulation of the wobble and/or other modifications. Similarly, land prepit addressing can additionally and/or alternatively be altered. The land prepit addressing is addressing incorporated onto the "land" between grooves that assist recorders in keeping track of where they are on the disc. In some instances, addressing and synchronization information is written onto the land area. Other such relevant parameters can also be altered in some embodiments. By altering some or all of these parameters of the media, the present embodiments improve the likelihood that a player would not recognize the media as a recordable media.

For example, some DVDs, such as DVD-Rs use organic dye technology. A dye material such as cyanine, phthalocyanine, or azo coats a wobbled groove molded into the polycarbonate substrate. The dye is backed with a reflective layer, for example a reflective metallic layer such as gold for high reflectivity. The wobbled pregroove provides a self-regulating clock signal to guide the laser beam of the DVD-R recorder as it "burns" pits into the photosensitive dye layer. The recorder writes data by pulsing the laser at high power (6 to 12 milliwatts) to heat the dye layer. The series of pulses avoids an overaccumulation of heat, which would create oversized marks. The heated area of the dye becomes dark and less transparent, causing less reflection from the metallic layer underneath. The disc can be typically read by standard DVD readers that ignore the wobble. Wobble frequency, for example, is eight times the size of a sync frame. The wobble is not modulated, such that it does not contain addressing information. Addressing and synchronization information is often pre-recorded into the land prepit area at the beginning of each sector of the disc. As the recorder's laser beam follows the pregroove, the land prepits are contacted peripherally and create a second pattern of light reflected back to the photodetector. Since the land prepits generate a different signal frequency than the pregroove wobble, the encoded information can be extracted allowing the recorder to identify sectors. The land prepits are typically offset in alternating directions to avoid conflict when they coincide on each side of the groove.

To implement these changes to the media, some recording devices are modified or manufactured to allow the device to make the desired modifications to the media. In some embodiments, firmware of the authoring device is updated or replaced so that the authoring device is capable of writing into areas of the media that are not normally writable and/or to alter characteristics and parameters of the media (e.g., wobble grooves, land prepit addressing and the like).

Some embodiments employ additional security in attempts to prevent unauthorized recording and/or counterfeit media. For example, additional authentication can be required prior to being able to record the desired content and/or is incorporated onto the media. In some embodiments, the authoring device accesses a remote authority 243, such as a remote server. The authority can authenticate the media, require authentication of the content, provide for the secure transmission of any and/or additional keys, and other similar authentication. In providing keys, the authority can supply a key specific to the content, a key specific to a player, specific to a media, and/or unique for different instances of a recording. By employing these additional authentications, the present embodiments further maintain the security of the system that could be potentially compromised by making keys available on a wider number of systems, than other wise envisioned in initial implementation of the keys.

The authentication provided through some embodiments allows players to confirm that the expected content on the media is actually the content recorded on the media. In some embodiments, the media can be pre-recorded with an authentication key supplied by the content owner to, for example, the media manufacturer. The authentication key is put onto the media allowing the use of such keys by players to verify the authenticity of the media. Unauthorized copies would not have the proper authentication. In some embodiments, the authorizing device remotely accesses an authority, such as a remote server, and supplies the authentication key that identifies the media confirming that the media conforms with desired security protocols, such as those provided through the present embodiments. These authentication keys can be applied in the control area or other areas of the media, such as in burst cut areas, and/or other areas that are generally inaccessible.

The authentication process, in some implementations, provides for the authentication of the media in that the media is appropriate for writing content, and/or to enhance encryption such that the playback device later checks the encryption against the physical media to verify the content is being played back from the originally intended media. For example, authentication keys can be generated based on an identification of the media, such as a serial number or some other identifier allowing the encryption to be specific to a particular, uniquely identified media. Players can be configured to verify media prior to playing to better ensure that the content of the media is authorized. In some instances, players may check for CSS compatibility, verify the validity of content (e.g., using authorization keys), watermarks and/or other forensic tracking added in the writing process and other such protection.

Figure 3:
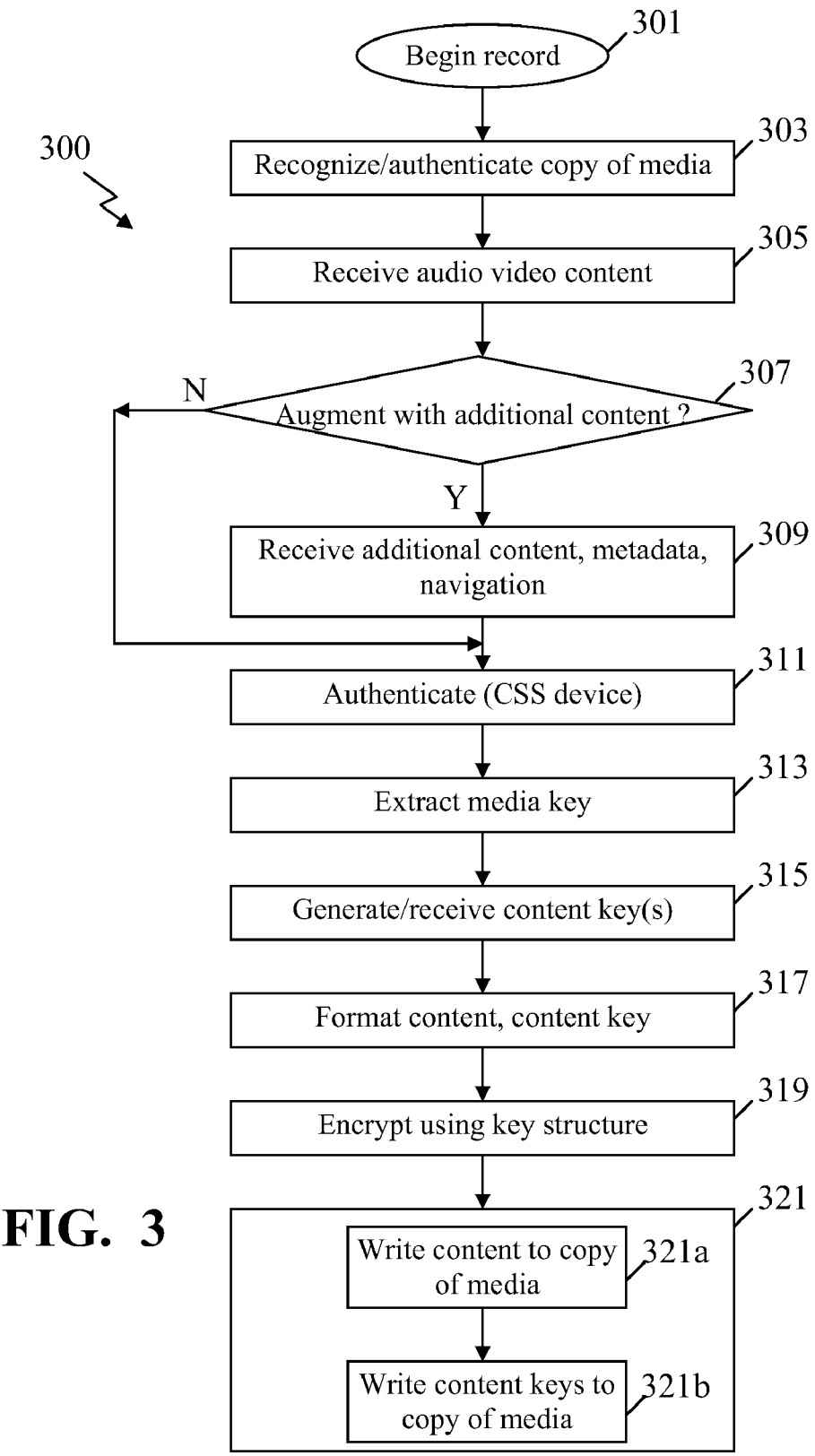
FIG. 3 shows a flow chart of a process for use in writing content to a media according to some embodiments.

FIG. 3 is a flow chart of a process 300 for use in writing content to a media according to some embodiments. The process 300 is described below based primarily on the example of a DVD using CSS encryption, however, the process can be applied to substantially any relevant media, and similarly apply to substantially any relevant encryption and/or protection. More generally, the process includes having a copy of media which already contains a first portion of a key structure, such as the disc key of a DVD. A second part of the key structure, such as the title keys, are later written onto the media as part of the process along with the data content, where the data content has been protected (e.g., encrypted) with the key structure and the two portions of the key structure are used cooperatively by a player in order to extract and decrypt the data content. The key structure can also include other portions, such as the set of DVD device keys, used to authenticate a device for playing the copy, writing the copy according to this process (particularly as the process may require access to portions of the medium to which access is normally not given), or both; authentication keys; and other such key structures.

In step 301, the process initiates the recording of content onto media. In step 303, the media in the drive is initially authenticated, and in some embodiments organized or reorganized. In authenticating the media, the player verifies that the media is a writable media, and further whether the media meets predefined parameters verifying that the protected content can be written to the media. In some embodiments, authentication is based at least in part on whether the media contains a set of write device keys in a control area along with a set of player device keys that are typically found in a standard DVD. This extra authentication step can be introduced as the control data, for both access and writing, are blocked in general consumer use and the process, as fully described below, reads the disc key from the control area in step 313 and writes the title keys into sector headers in step 321.

In step 305, content is retrieved and/or obtained, such as audio/video content, that is to be written into the data area of the media. The content can be retrieved from a local source (e.g., from a separate DVD, a hard drive, and other such sources), downloaded from remote storage (e.g., accessing a database over the Internet), or from other media, such as peripheral devices coupled with the player (e.g., microphones, instruments, digital cameras, and other peripheral devices). At step 307, the process determines whether the content is to be augmented with additional content, metadata, navigational parameters and the like. If there is no augmenting data, the process continues to step 311. Alternatively when the content is to be augmented, step 309 is entered where the process receives the additional audio or visual content, metadata, navigation data, additional content generated by the user, and/or other such content. The additional content can also be from local source (e.g., DVD, hard drive, etc.) downloaded, or from other media. Details on using these various elements and the authoring process are described in U.S. patent application Ser. Nos. 10/123,816, 10/119,993 10/408,027, and 60/439,055 as incorporated by reference above. Similarly, U.S. patent application Ser. No. 10/754,136, filed Jan. 8, 2004, and which is hereby incorporated by reference, describes metadata and the utilization of metadata.

In step 311, the content is authenticated, which can then be decrypted (e.g., from CSS, or other encryption) as needed. The authentication of the content can be based on extracting and/or generating the appropriate encryption keys (e.g., disk keys, title keys, authentication keys, and other such keys) and/or receiving additional authorization from a remote server. In step 313, the media key portion (such as a disc key portion) of one or more key structures pre-recorded on the media is extracted from the copy of the medium.

In step 315 the content key or keys (e.g., title key or keys) are obtained. The content keys can be generated as part of the process using an algorithm, obtained from a granting authority, a supply can be obtained and used, and/or obtained from other such sources or combinations thereof. Note that steps 303, 305, 307, 309, 311, 313, and 315 can be done in a various orders, except for steps which depend upon a particular earlier step, for example, step 313 would be after step 303.

In step 317, the content to be written to the media (audio/visual content, etc., as well as the content key portion of the key structure in some implementations) is then formatted. In step 319, the content is encrypted using the key structure. This may also include encrypting a portion of the key structure depending on the particulars of the key structure and the encryption process. For example, in some DVD/CSS processes, the display content is encrypted with the title keys and the title keys are encrypted with the disc key. In step 321, the content is written to the media. In some embodiments, step 321 is a two part step, where the content and/or data is written in step 321a (e.g., into the data portion 211 of the media), and the title keys are written in step 321b (e.g., into the sector headers).

Figure 4:
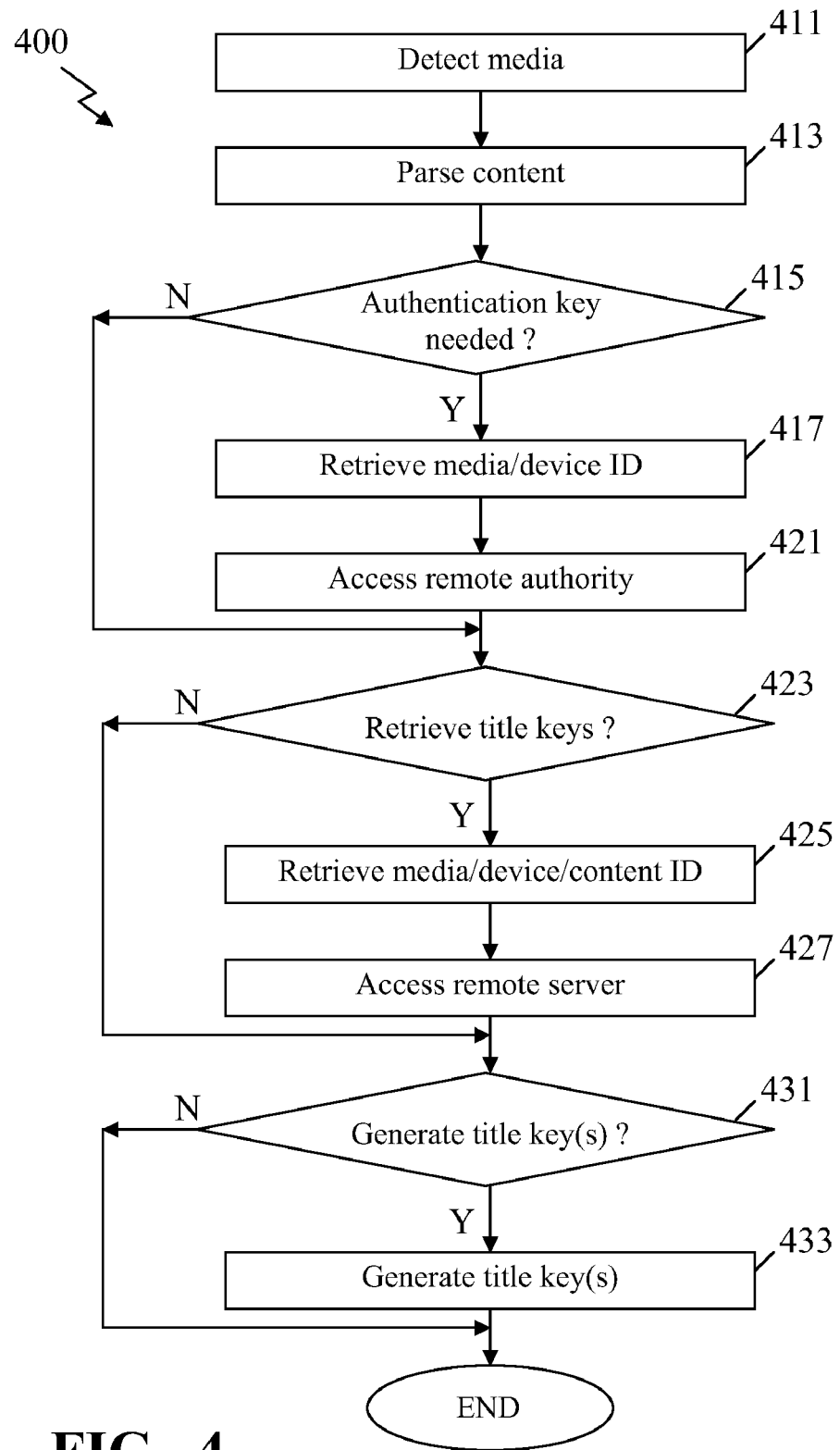
FIG. 4 depicts a simplified flow diagram of one implementation of a process for use in authenticating media.

FIG. 4 depicts a simplified flow diagram of one implementation of a process 400 for use in authenticating media. In step 411, the media is detected. In step 413, the contents of the media are parsed to verify that the media is a writable media. For example, the process 400 detects a media identifier indicating the media is writable, determines whether predefined portions of the media are left blank ready to receive written content, and/or other such determinations or combinations thereof. In step 415, the process determines whether an authentication key is needed. When an authentication key is not needed, the process skips to step 423. Alternatively, when an authentication key is needed, step 417 is entered where a media identification (e.g., a serial number or other such identifier) and/or authoring device identification are retrieved from the media. In step 421, a remote authority device is accessed and the media identification is supplied. Upon verification by the authority device, an authentication key is provided.

In step 423, the process determines whether at least a portion of the title keys are to be retrieved from a remote server. For example, the process can determine whether the media is pre-recorded with at least a portion of the key structure (e.g., one or more disc keys and/or device keys). If the title keys are not to be remotely retrieved, the process skips to step 431. Alternatively, step 425 is entered where a media identification, authoring device identification, and/or an identification of the content to be recorded is retrieved from the media, the device, and/or content. In step 427, a remote server is accessed and one or more title keys are retrieved following an additional verification by the server, such as supplying one or more write device keys, a media identification, content identification, and/or other such parameters. In step 431, it is determined whether one or more title keys are to be generated, for example based on one or more disc keys. If additional title keys are not to be generated, the process 400 terminates, otherwise, step 433 is entered where one or more title keys are generated. In some embodiments, the step 415 and 423 are both implemented prior to accessing one or more remote authority devices and/or servers (steps 421 and 431) to obtain the authentication key(s) and/or title key(s) so that remote accesses is implemented at the same time speeding the process.

Figure 5:
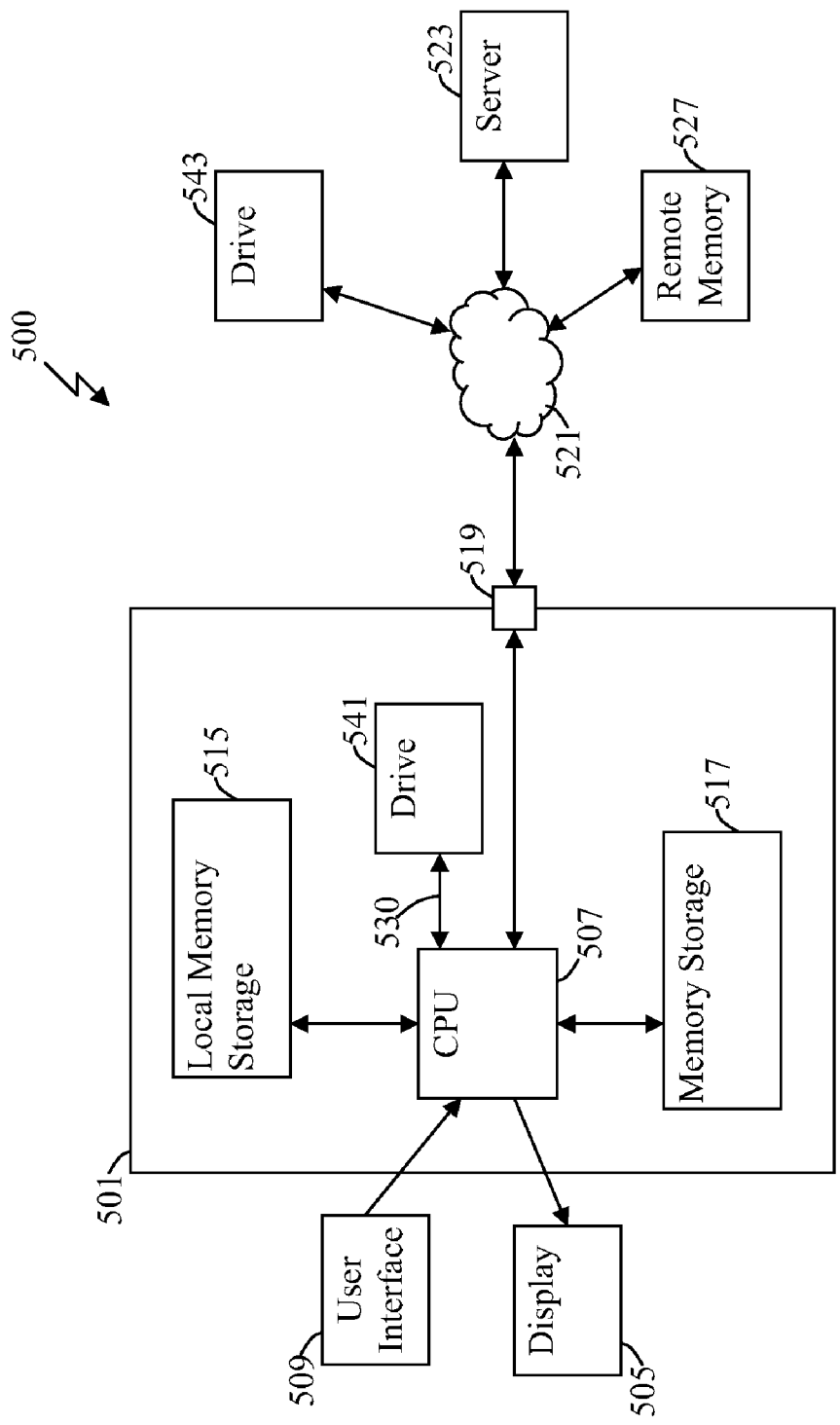
FIG. 5 depicts a simplified block diagram of a system according to some embodiments that allows content to be securely written to media.

FIG. 5 depicts a simplified block diagram of a system 500 according to some embodiments that allows content to be securely written to media. The system is implemented in hardware and/or software. In some embodiments, different aspects of the embodiment can be implemented in either client-side logic or a server-side logic. As will be understood in the art, the embodiments or components thereof may be embodied in a fixed media program component containing logic instructions and/or data that when loaded into an appropriately configured computing device cause that device to perform according to the embodiments. As will further be understood in the art, a fixed media program may be delivered to a user on a fixed media for loading in a users computer or a fixed media program can reside on a remote server that a user accesses through a communication medium in order to download a program component.

The system 500 includes an information appliance 501 (or digital device), such as a personal computer, workstation or other authoring device, that may be understood as a logical apparatus that can read instructions from local memory storage 515, 517, and/or remote memory storage 527 accessed through a communication connection or port 519 allowing direct connection with the remote memory and/or connection through a network 521. The local storage 517 can be implemented through substantially any permanent storage and/or removable storage, such as ROM, RAM, disk drives, and substantially any other relevant memory or combinations of memory The information appliance 501 can thereafter use those instructions to direct server or client logic, as understood in the art, to implement aspects of the embodiments. Further, the logical information appliance 501 is implemented through a computer system or consumer electronics devices, containing a processor such as a central processor 507 and/or microprocessor, user input devices and/or other peripheral devices 509 (e.g., keyboard, mouse, other devices containing content (e.g., portable computer, personal digital assistant, etc)), one or more memory and/or disk drives 515, and output devices 505, such as a display, speakers, other external memory, or other such output. Logic, programming and/or data stored in memory 515 and/or 517 may be used to program such a system and may represent a disc-type optical or magnetic media, magnetic tape, solid state memory, substantially any other relevant memory, and/or combinations of memory. The present embodiments may be implemented in whole or in part as software recorded on the memory 515, 517.

In some embodiments, the appliance 501 further includes the communication port 519 allowing the appliance to communicate with external devices, to initially receive content, authorization, augmenting content, data, instructions that are used to program and/or control the appliance, and other such information. The communication port 519 can be substantially any relevant type of communication connection. In some embodiments, the CPU 507 couples with remote servers 523 and/or other devices through the port 519 and over the network 521. For example, the CPU 507 can retrieve content, authenticate content and/or media (e.g., through a digital rights management) by communicating with a server 523 over the network 521.

In some implementations, audio/video content, authoring project files, augmentation content, and other data are read from or written to storage media through one or more local disc drives 541 by means of local bus 530 or remote drives 543 over the network 521, or other data input/output mechanisms. In operating, the CPU can retrieve content to be written to a media from memory 515, 517, from a local drive 541, remote drive 543 and/or remote server 523. The CPU further accesses the media upon which the content is to be written to authenticate the media. The media is typically inserted into a local drive 541. In some embodiments, however, the media can be positioned in remote drives 543. The content is encrypted with the title, disc, authentication and/or other keys and communicated to the drive 541 (or 543) containing the media. Similarly, the content can be augmented with additional content, additional controls and/or parameters as described above, that are obtained from local memory 515, 517, remote memory 527 and/or remote servers and/or databases 523.

In some implementations, the authoring apparatus 501 may be embodied in whole or in part within the circuitry of an application specific integrated circuit (ASIC) or a programmable logic device (PLD). In such a case, the apparatus may be embodied in a computer understandable descriptor language which may be used to create an ASIC or PLD that operates as herein described. Additionally and/or alternatively, the authoring apparatus in some implementations is included in a consumer electronic device. The consumer electronic device can include instructions stored, for example, in an embedded non-volatile memory or other internal storage medium.

Figure 6:
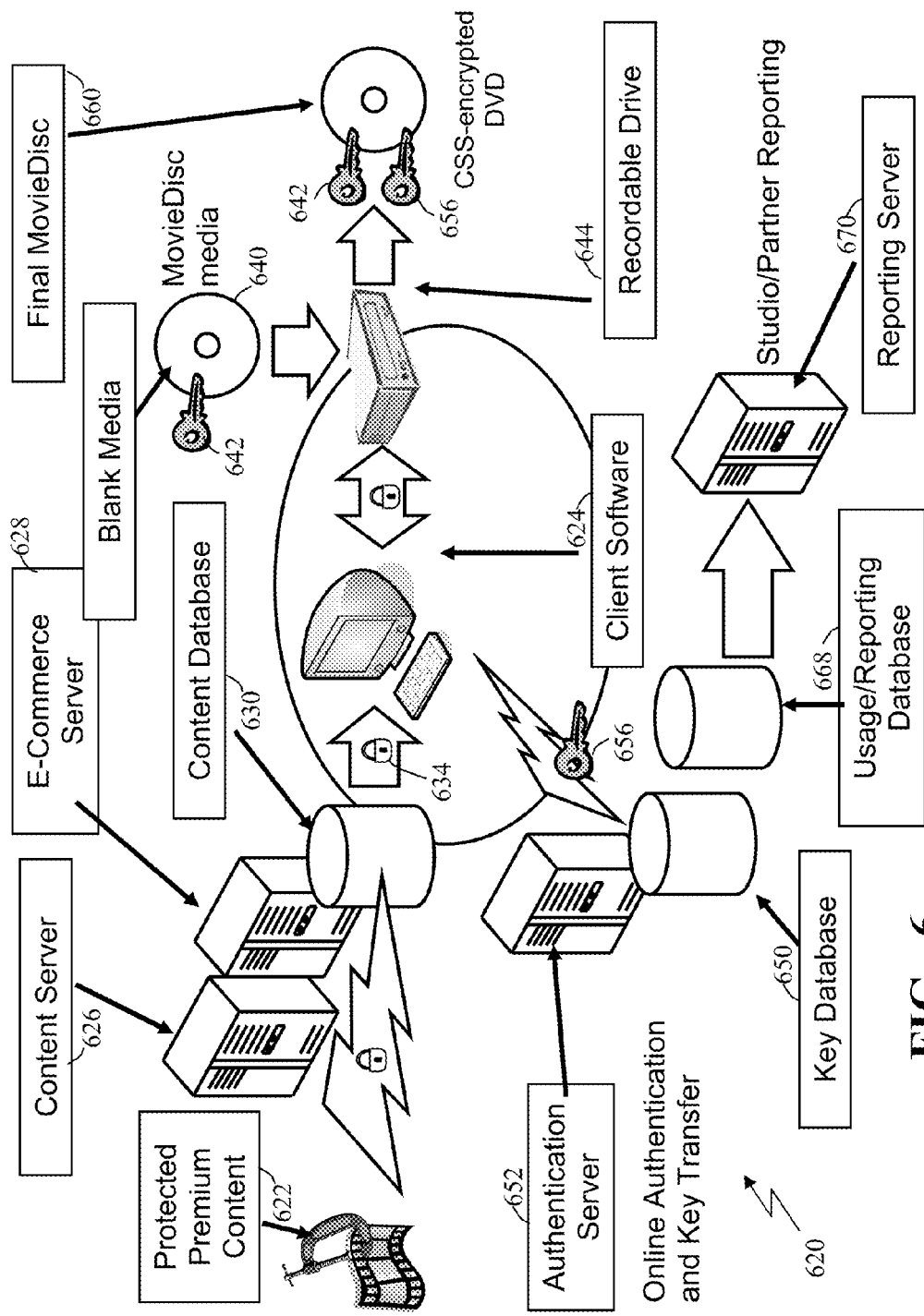
FIG. 6 depicts a simplified block diagram of a system providing the recording of content in a protected format onto media (e.g., according to CSS)

FIG. 6 depicts a simplified block diagram of a system 620 providing the recording of content in a protected format onto media (e.g., according to CSS). Protected content 622 is supplied to client system and/or software 624 (implemented for example on a personal computer). In some implementations, the client system 624 remotely accesses the content from a content server 626, E-commerce server 628, and/or content database 630. When the content is remotely accessed, for example over a network, the content is typically protected when transferred 634.

The client system 624 accesses a writable media 640, such as a specially manufactured and distributed DVD, and in some implementations extracts one key 642 and/or other authentication parameters. The key 642 is utilized by a recordable driver 644 coupled with the client system to write the retrieved content to the media 640. Typically, in writing the content, the recordable driver utilizes the extracted key(s) 642 and/or additional keys that are generated and/or retrieved from remote sources. For example, the client system 624 can access one or more remote key databases 650. In some implementations, the key databases are associated with authentication servers 652 that authenticate the client system, for example using one or more of the keys or authentication parameters (e.g., serial number and the like) extracted from the media, upon receiving payment, and other such authentication. Once authenticated one or more additional keys 656 are forwarded to the client system for use in protecting the content to be written to the blank media 640 to produce a resulting media 660 containing the content that is protected by the extracted key 642 and/or the one or more additional keys 656.

In some embodiments, the system 620 further includes reporting database 668 and reporting systems 670 that monitor the keys and/or content that are utilized, the individuals copying the content and other such parameters. The reporting service provides these reports to various interested parties, such as the content providers (e.g., movie studios) allowing the providers and other parties to utilize the reports.

Figure 7:
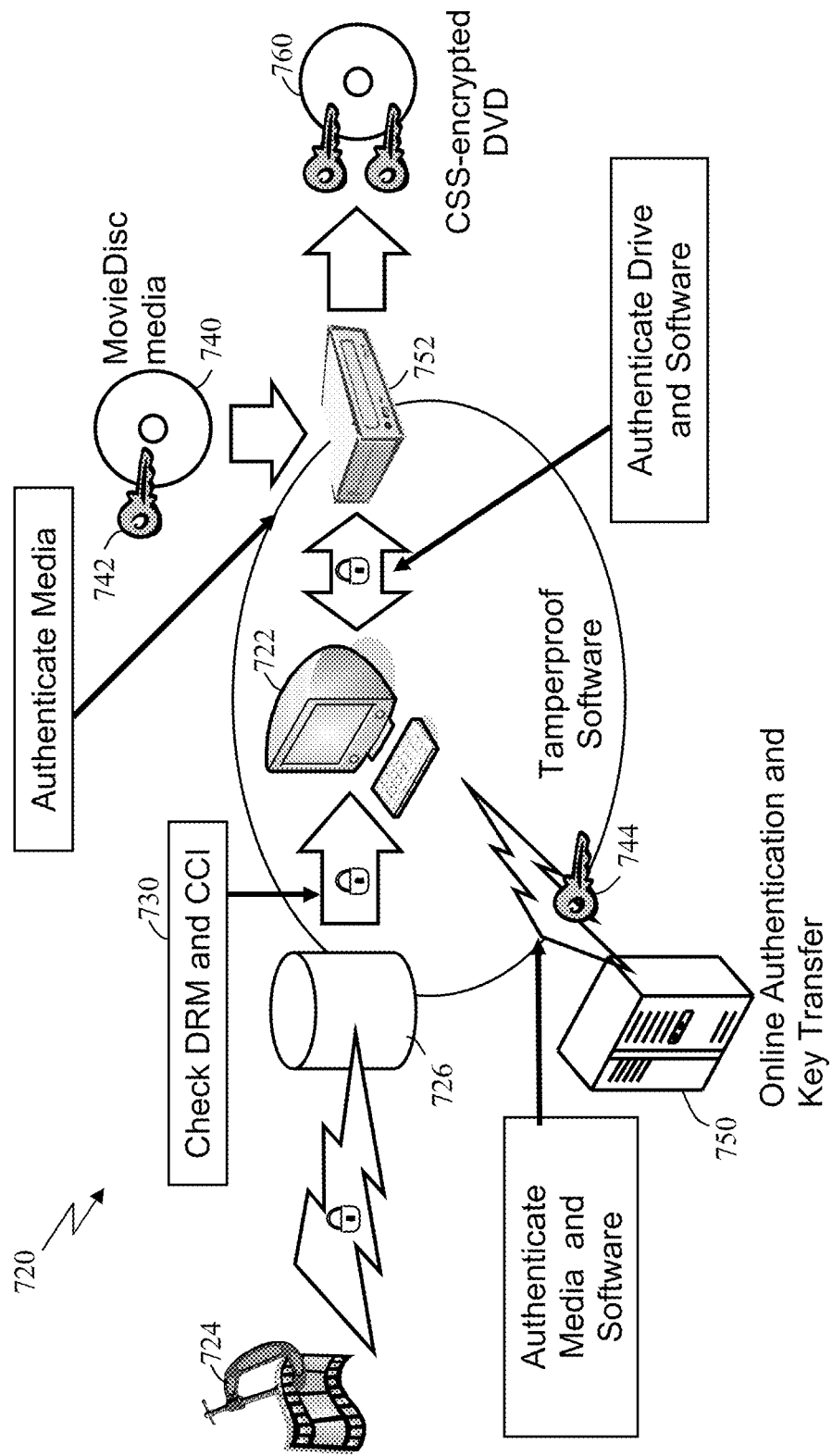
FIG. 7 depicts a simplified content authoring system according to some embodiments.

FIG. 7 depicts a simplified content authoring system 720 according to some embodiments. A client system 722 accesses content 724 from a content source 726. For example, the client system remotely accesses a content database through a DRM and/or CCI 730 that verifies and/or defines the use (e.g., DRM provides a license). The client system 722 extracts one or more keys and/or authentication parameters 742 from a writable media 740. Utilizing the extracted key and/or parameters, the system in some implementations retrieves one or more additional keys 744 from a secondary source 750. Typically, the secondary source 750 authenticates the media and/or the client system, for example using the extracted key 742 and/or authentication parameters (e.g., media serial number). A recordable drive 752 (which in some embodiments is part of the client system) records the content to blank media 740 in a protected format (e.g., CSS encryption) using the one or more keys to produce the recorded media 760.

As indicated above, the content to be written can be obtained from substantially any relevant source. In some implementations, the present embodiments allow for the authorized duplication of media (e.g., duplicating DVDs). In such implementations, the DVD may provide for a limited number of copies to be made (e.g., one back-up copy in case of damage to the original), and/or within a limited time period. Additionally and/or alternatively, the copying of the content from the other media may require authorization, where a user pays a distributor or the content owner for the right to make one or more copies. Similarly, the present embodiments can write content received from a local memory or accesses remotely (e.g., downloaded from the Internet). Similar authentication and authorization could be employed with this content. In downloading the content, once authorization is verified, the content can be downloaded through substantially any relevant downloading and recording scheme, such as trickle down where content is downloaded in the background operation of the authoring device, progressive downloading where the recording initiates prior to receiving the entire content, and other such schemes.

In some embodiments, the content is streamed to a receiving device through broadcasting, such as cable television, satellite television and other such broadcasting. The content can be further identified or label to specify whether a recipient is authorized to copy the content and/or how many times the content can be copied. For example, with some broadcast content, strings of bits flag the content as being authorized for copying or not. Some embodiments identify these bits to verify the content can be copied. Once verified, the content can be written to the specialized media in a protected form, and in some implementations written such that the content meets CSS requirements, satisfying the U.S. Federal Communications Commission requirements, and further providing compatibility with many existing players.

For example, video-on-demand supplies a user with audio/video content upon the user's request. These on-demand systems are typically easy to use, allow content to be downloaded for viewing, and provide almost instant gratification. Video-on-demand, however, only provides users with a limited viewing time window, and users are often limited to viewing from a computer terminal instead of a television. The present embodiments alternatively will allow users, once authorized by the distributor, to receive and securely record the on-demand content. The use can then view the content whenever the user desires, and can view it from his/her television through the DVD or other media player bridging the gap between Internet-connected computers with movie viewing environments. This additionally opens an additional stream of revenue for content owners, such as movie studios, allowing for the sale of content directly to consumers while still maintaining security over the content. Further, this stream of revenue is achieved without manufacturing DVDs and/or maintaining inventories. Still further, in delivering content to a user, the user identification can be required, allowing the content provider with the ability to continue to market to the user.

As described above, many embodiments allow for the augmentation of content. In some implementations, the content can be augmented with various added protections to better ensure authorized copying in attempts to prevent counterfeit productions. The augmentation can further contain additional parameters and/or identifiers in attempts to track down sources of unauthorized and pirated copies. In some implementations, watermarking, unique title keys (e.g., title keys unique to each DVD) and other forensic and/or finger printing is incorporated into copied content and/or added to the media. The watermark can include hidden, unique information about the content, the device or system making the copy, and if available, about the person or company making the recording. As such, illegal or unauthorized copies can more easily be traced back to an original content and/or device making the copies.

For example, many movie studios distribute pre-release DVDs to critics, other screeners, members who vote for film awards, and other releases. By incorporating one or more unique watermarks, unique title keys, and/or other forensics into a copied version of the content uniquely specific to the source of the content (e.g., the pre-released DVD), the studios can determine which specific pre-released media of the content was used in generating the copy and thus identify the individual that received the pre-released version. As such, the present embodiments allow content owners to make serialized, uniquely identified media (e.g., watermarking and other uniquely identifying content), while still providing copy protection (e.g., encryption) so that the copied content is not released in-the-clear.

The present embodiments provide methods and systems for use in changing the media drives (e.g., DVD drives for writing), the media (e.g., the DVD), and the process by which the drives write to recordable media. The media drives in writing content use protection (i.e., encryption system) such that, in some implementations, the media is compatible with existing playback devices. Some embodiments write content to areas of the media that are not typically accessible by the user when reading data from the disc. Further, some embodiments incorporate additional securities to prevent unauthorized copying of content to traditional recordable DVDs, but instead utilize specialized media formatted to be identified and/or authenticated. In writing to the specialized or custom media, some embodiments apply protection to the custom, writable media, allowing content (e.g., movie) to be recorded onto a DVD while employing at least copy protections applied to typical replicated DVDs.

The present embodiments present techniques whereby recordable media (e.g., DVDs) can be encrypted in order to protect their content. The systems and methods of the present embodiments enable secure transfer of content (e.g., video and audio content) from networked or local storage systems to recordable media, such as DVD, through the combination of specialized DVD authoring and data writing methods and corresponding software, and specialized recordable media, resulting in a DVD-legal CSS encrypted recordable disc. The embodiment makes it possible to download copyrighted video and audio content and securely transfer the content to recordable DVD media with the resulting DVD-Video/Audio disc being both CSS encrypted and maintaining compliance with the DVD-Video specification.

The present methods and corresponding systems (implemented as software components and/or hardware components) access video and audio content data from local or networked storage and provide a secure path for writing the content onto recordable media. The embodiments use a key structure to encrypt, such as through the CSS encryption process, and in some implementations write the content on the recordable media in such a way as to be playable on typical standard DVD-Video players.

The recordable media in some implementations is a specially manufactured recordable media, such as DVDs in the DVD+R, DVD+RW, DVD-R, DVD-RW, HD-DVD, BD-R, BD-RE, BD-ROM formats, compact discs in CD-R, CD-RW formats, and other such formats. In some embodiments, device keys and encryption keys are pre-recorded onto a reserved, generally non-writeable lead-in area of the recordable media in a form consistent with standard manufactured and/or replicated media. The keys for the content portion of the media can then be derived from the keys pre-recorded onto the reserved portion of the disc and/or remotely retrieved, and used to encrypt some or all of the content portion when it is written. According to a further aspect, in a particular embodiment the title keys are written into sector header, which is often another area that is not usually accessible. Some embodiments, additionally employ an authoring system where received, and possibly protected content, can be augmented with additional audio, video, other parameters and/or control information, and multiplexed into DVD-Video compliant files.

While the embodiments herein disclosed has been described by means of specific embodiments and applications thereof, numerous modifications and variations could be made thereto by those skilled in the art without departing from the scope of the embodiments set forth in the claims.

What is claimed is:

1. A method for writing content to a media, comprising:
retrieving a first portion of a key structure from a media where the first portion of the key structure is pre-recorded on the media;
generating a second portion of the key structure based on the retrieved first portion of the key structure retrieved from the media following the retrieval of the first portion of the key structure from the media;
encrypting content based at least on the second portion of the key structure, producing encrypted content;
writing, through a processor programmed to record digital content, the encrypted content onto the media comprising writing the encrypted content to a data portion of the media;
wherein the first portion of the key structure is pre-recorded to a control area of the media prior to retrieving the first portion of the key structure to be used once retrieved from the media in generating the second portion of the key structure, and the first portion of the key structure comprises pre-recorded disk key and device key set;
accessing a remote authority;
generating a third portion of the key structure from information provided by the remote authority; and
writing the third portion of the key structure to the media;
wherein the encrypting the content comprises encrypting the content using both the second and third portions of the key structure such that the single instance of the encrypted content is encrypted according to both the second and third portions of the key structure.

2. The method of claim 1, further comprising:
writing the second portion of the key structure onto the media.

3. The method of claim 2, wherein the writing the second portion of the key structure comprises writing the second portion of the key structure in section headers.

4. The method of claim 1, further comprising:
accessing a remote authority;
acquiring an authentication from the remote authority; and
recording the authentication on the media.

5. The method of claim 1, further comprising:
augmenting the content with additional content comprising additional multimedia content configured to be played back;
the encrypting the content comprises encrypting the content and the additional content; and
the writing the encrypted content comprises writing the encrypted content and the encrypted additional content to the media.

6. The method of claim 1, wherein the writing the encrypted content comprises writing the content such that the media is compatible with a content scramble system and the media is a portable digital recording media.

7. The method of claim 1, further comprising:
altering the physical properties of the media, during a manufacturing process, such that, after the writing of the encrypted content to the media, the media appears as a non-writable media to a consumer electronic device that subsequently accesses the media following the writing of the encrypted content to the media.

8. The method of claim 1, wherein the retrieving the first portion of the keys structure comprises retrieving, by the recording apparatus, the first portion of a key structure from the media accessed by the recording apparatus, where the media is a portable storage media adapted to be temporarily cooperated with the recording apparatus, the first portion of the key structure is pre-recorded on the media prior to the media being accessed by the recording apparatus, and the encrypted content is written by the recording device to the media following the retrieving of the first portion of the key structure and the encrypting the content.

9. The method of claim 8, further comprising:
accessing a remote source and retrieving, from the remote source, one or more additional parameters associated with the content;
applying an algorithm to the one or more additional parameters generating one or more title keys, wherein the second portion of the key structure comprises the one more generated title keys; and
recording the title keys to the media.

10. A method for use in recording content to a media, comprising:
accessing a media;
determining whether the media includes at least a first portion of a key structure;
retrieving the first portion of the key structure from the media, when the media includes at least the first portion of the key structure, where the first portion of the key structure is pre-recorded to a control area of the media prior to retrieving the first portion of the key structure to be used, once retrieved from the media, in generating a second portion of the key structure, and the first portion of the key structure comprises pre-recorded disk key and device key set;
accessing a remote device, when the first portion of the key structure is not included on the media, and retrieving the first portion of the key structure from the remote device when the first portion of the key structure is not included on the media;

accessing content;

protecting the content based on the first portion of the key structure comprising generating a second portion of the key structure based on the first portion of the key structure and protecting the content with the second portion of the key structure;

authenticating the media as being a writable media prior to performing the determining whether the media includes at least a first portion of a key structure, such that the retrieving the first portion of the key structure and the accessing the remote source are not performed when it is determined the media is not authenticated as a writable media; and writing, through a processor, the protected content onto the media.

11. The method of claim 10, wherein the media is a portable digital storage media and the protecting the content comprises encrypting the content with the second portion of the key structure such that the writing the protected content comprises writing the encrypted content to the portable media.

12. The method of claim 11, further comprising:

generating a media image comprising the encrypted content and the second portion of the key structure; and the writing the protected content comprises writing the media image to the media.

13. The method of claim 10, further comprising:

writing the first portion of the key structure to the control area of the media when the key structure is not included in the media.

14. The method of claim 10, wherein the authenticating comprises:

retrieving an authentication key from the media;

accessing a remote authority; and verifying that the authentication key corresponds with the media through the remote authority.

15. The method of claim 10, further comprising:

retrieving an authentication key; and the protecting the content comprises protecting the content with the first portion of the key structure and the authentication key.

16. The method of claim 10, further comprising:

evaluating the content;

determining whether the content allows copying; and preventing the writing of the protected content when it is determined that the content does not allow copying.

17. The method of claim 10, further comprising:

augmenting the content by adding a watermark; and the writing the protected content further comprises writing the watermark to the media.

18. The method of claim 10, wherein the authenticating comprises:

retrieving information from the media;

wherein the authenticating the media comprises authenticating the media using the information retrieved from the media.

19. A portable recording media, comprising:

a digitally writable surface that is optically readable;

a control area comprising a pre-recorded first portion of a key structure comprising a disk key and device key wherein the first portion of the key structure is pre-recorded prior to being retrieved to generate a second portion of the key structure and prior to the portable recording medium being accessed by a data recording device; and a data portion to record, through the data recording device:

non-pre-recorded content protected according to both the second portion of the key structure, generated with a processor according to at least a portion of the first portion of the key structure retrieved from the control area, and a third portion of the key structure generated with a processor using information acquired from a remote authority, such that the single instance of the protected content is protected according to both the second and third portions of the key structure; and the second and third portions of the key structure.

20. The recording media of claim 19, further comprising:

an authentication key defined in the control area.

21. The recording media of claim 19, wherein the data portion further comprising sector headers that are writable to receive the second portion of the key structure.

22. The recording media of claim 21, wherein the second portion of the key structure further comprises title keys generated from at least the device key set and recorded through the recording device into one or more of the sector headers of the data portion.

23. The recording media of claim 19, further comprising characteristics that are changed such that the media is not recognized as a writable media.

24. A method of use in recording content on a media, comprising:

recording content onto a digitally writable disc that is further optically readable, the recording the content comprising:

generating a first portion of a key structure from pre-recorded content retrieved from the disc and used to generate the first portion of the key structure following the retrieval of the pre-recorded content from the disc;

accessing a remote authority;

generating a second portion of the key structure from information provided by the remote authority; and protecting the content with at least both the first and second portions of the key structure prior to recording the content such that the protected content is protected according to both the first and second portions of the key structure; and altering physical characteristics of the disc comprising at least altering the pre-recorded content that is pre-recorded onto the disc such that the disc no longer appears as a writable disc;

wherein the recording content includes recording, as controlled by a processor, the first and second portions of the key structure onto the digitally writable disc.

25. The method of claim 24, wherein the altering the physical characteristics comprises altering a reflectivity of at least a portion of the disc.

26. The method of claim 24, wherein the altering the physical characteristics comprises altering sector headers of the disc.

27. The method of claim 24, wherein the altering the physical characteristics comprises altering at least a portion of wobble grooves of the disc.

28. The method of claim 24, wherein the altering the physical characteristics comprises altering land prepit addressing.

* * * * *